Sept. 15, 1964
L. A IDDINGS
3,148,550
ACCELERATION MEASURING GYROSCOPE
Filed Dec. 14, 1962
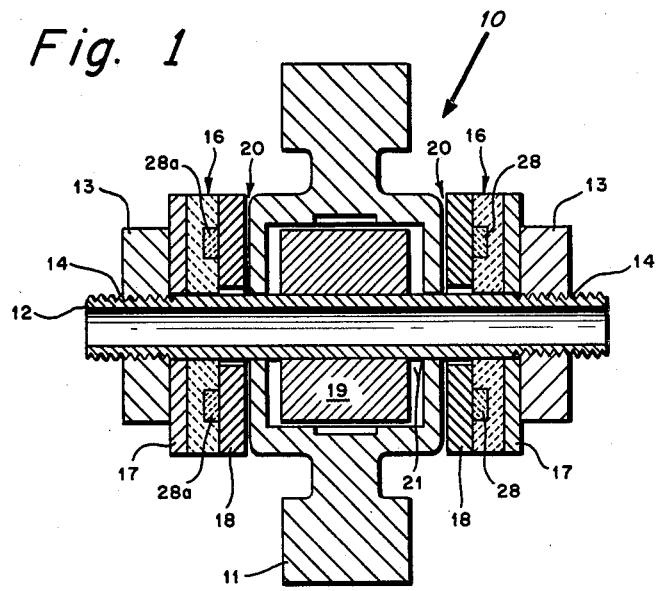
Fig. 1
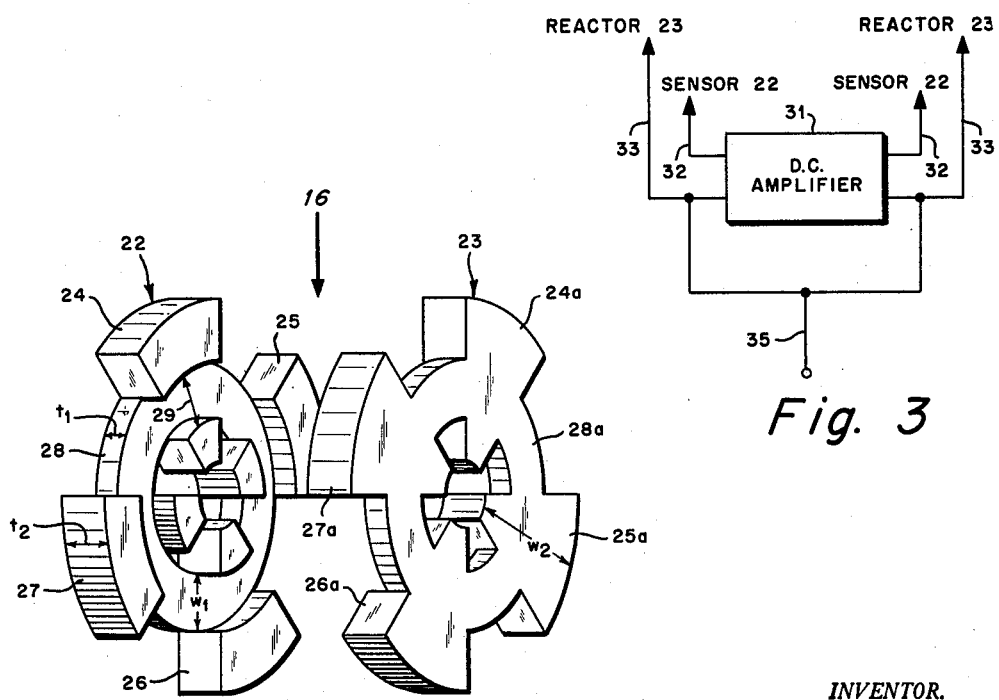
Fig. 2
Fig. 3
INVENTOR.
LLOYD A. IDDINGS
BY
Henry Hausen
AGENT

United States Patent Office 3,148,550
Patented Sept. 15, 1964

3,148,550
ACCELERATION MEASURING GYROSCOPE
Lloyd A. Iddings, Arlington, Va., assignor to the United States of America as represented by the Secretary of the Navy
Filed Dec. 14, 1962, Ser. No. 244,839
7 Claims. (Cl. 74—5.6)
(Granted under Title 35, U.S. Code (1952), sec. 266)

The invention described herein may be manufactured and used by or for the Government of the United States of America for governmental purposes without the payment of any royalties thereon or therefor.

This invention relates to a gyroscope and more particularly to an acceleration measuring gyroscope such as used in an inertial navigation guidance system.

Gyroscopes are commonly used in inertial navigation systems to provide a reference platform. Deviation from the reference platform orientation is normally indicative of deviation from a programmed or predetermined course of flight. Ordinarily three rate integrating gyroscopes are needed to establish platform level with at least two additional acceleration measuring devices for sensing the platforms lateral motion.

Thus, each gyroscope platform arrangement requires the addition of two acceleration measuring devices which are precision mounted to obtain the necessary accuracy in measuring acceleration. At the same time such additional components while presenting an extremely difficult mounting problem also take up substantial volume in a unit where space is obviously at a premium.

The present invention contemplates an instrument wherein the lateral acceleration measuring device is made an integral part of the gyroscope. Thus, there is provided in a single unit a device which functions as a gyroscope and an acceleration sensing device. In the construction of the present invention the gyroscope comprises a rotor bearing and two thrust bearings of the conventional air bearing type. A piezoelectric sensor-reactor crystal is mounted between each thrust bearing plate and the gyroscope support shaft. Any force due to acceleration along the support shaft is converted into a proportional voltage by the piezoelectric sensor crystal. Due to the inertia of the rotor of the gyroscope this force causes an infinitesimal compression of the piezoelectric sensor crystal. This voltage applied to the piezoelectric reactor crystal returns the rotor of the gyroscope to its equilibrium position and is a measure of the acceleration of the gyroscope in a direction parallel to its support shaft. This voltage proportional to acceleration is normally used to provide the control functions in a guidance system hitherto provided by separate acceleration measuring devices.

Therefore, it is an object of the present invention to provide a gyroscope and an acceleration measuring device in a single unit.

Another object of the present invention is to provide an acceleration measuring gyroscope wherein infinitesimal changes of position of the gyroscope rotor in response to acceleration are converted directly to a voltage proportional to the force producing acceleration.

Still another object of the present invention is to provide an acceleration measuring gyroscope wherein a gyroscope structure is provided with piezoelectric sensor-reactor crystals located between each of the thrust bearing plates and the support shaft of the gyroscope rotor which convert displacements of the gyroscope rotor along the support shaft to a voltage proportional to the displacements.

Yet another object of the present invention is to provide an acceleration measuring gyroscope wherein rotor displacement in a direction along the support shaft due to acceleration forces is detected and converted into a proportional voltage by a sensor piezoelectric crystal and wherein a reactor piezoelectric crystal re-converts the acceleration proportional voltage into a physical expansion which restores the rotor to its equilibrium position.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates in cross section a preferred embodiment of the present invention;

FIG. 2 illustrates in pictorial form the piezoelectric sensor-reactor crystals; and FIG. 3 illustrates an electrical circuit which may be used with the present invention.

Referring more particularly to FIG. 1 there is shown the acceleration measuring gyroscope 10 of the present invention. The acceleration measuring gyroscope comprises a gyroscope rotor 11 mounted for rotation about gyroscope support shaft 12. A pair of retaining free load nuts 13 are secured to gyroscope support shaft 12 by means of screw threads 14. A pair of piezoelectric sensor-reactor crystals 16 to be more fully described hereinbelow are mounted on gyroscope support shaft 12 between a retainer plate 17 and a thrust bearing plate 18. A motor 19 which is mounted on gyroscope support shaft 12 in any conventient manner may be used to impart rotative motion to gyroscope rotor 11.

During rotation gyroscope rotor 11 is supported by a gas spin bearing. The gas spin bearing is divided into two parts, the rotor bearing 21 and two thrust bearings 20. The gas spin bearings used in the gyroscope are conventional having a principle of operation which is well known in the art. Thus, when the gyroscope starts operation which is similar to the operation of electric motor with drive sleeve bearings, the gyroscope will be supported on gas or air at that speed where the bearing builds up enough pressure to equalize pressure on all sides of the rotating shaft. Acceleration in one direction or the other along the gyroscope support shaft 12 tends to displace the gyroscope rotor 11 to cause it to bear against one or the other of air thrust bearings 20 with a force proportional to the acceleration. Consequently, the gaps of air thrust bearings 20 are shortened on one side and lengthened on the other.

Obviously, FIG. 1 does not purport to show the complete construction of a gyroscope and it is to be understood that gyroscope support shaft 12 may be further supported in a gyroscope housing which completely encloses and hermetically seals against the atmosphere the acceleration measuring gyroscope of the present invention.

Referring more particularly to FIG. 2 there is shown the piezoelectric sensor-reactor crystal 16 used in the present invention. Each piezoelectric sensor-reactor crystal comprises a sensor 22 and a reactor 23 composed of ceramic material as, for example, barium titanate.

Since piezoelectric sensor 22 is identical in size and configuration with piezoelectric reactor 23, only piezoelectric sensor 22 will be described in detail.

Piezoelectric sensor 22 comprises four arcuate segments or wedges 24, 25, 26 and 27 equal in size and equally spaced about a central opening 27 which has a diameter slightly larger than the diameter of gyroscope support shaft 12. An annular ring 28 formed integral with each of the four arcuate segments 24, 25, 26 and 27 interconnects each of the segments to form a unitary construction. The anular ring 28 is coplanar with one side of each of the arcuate segments 24, 25, 26 and 27 and has a thickness $t_1$ extending away from the coplanar surface which is equal to one-half the thickness $t_2$ of each of the four segments 24, 25, 26 and 27. The other surface of the annular ring 28 forms a groove 29 with the remaining thickness of each of the segments. The annular ring 28 is radially located at the approximate center of each segment 24, 25, 26 and 27 and has a width $w_1$ which is approximately equal to one-third of the width $w_2$ of each of the segments 24, 25, 26 and 27.

Piezoelectric reactor 23 comprises arcuate segments 24a, 25a, 26a and 27a and annular ring 28a. Since piezoelectric reactor 23 is identical in configuration and size to that of piezoelectric sensor 22, piezoelectric reactor 23 forms the unitary sensor-reactor unit 16 with piezoelectric sensor 22. In other words, arcuate segments 24a, 25a, 26a and 27a fit between arcuate segments 24, 25, 26 and 27 with annular ring 28a filling the groove 29 of each of the segments 24, 25, 26 and 27. Likewise, annular ring 28 fits into the grooves of arcuate segments 24a, 25a, 26a and 27a which are not shown. Thus, in its assembled state each of the piezoelectric reactor-sensor crystals 16 appears as a single circular disc having an aperture through the center which fits on shaft 12 as shown in FIG. 1.

As shown in FIG. 1, when the acceleration sensing gyroscope is subjected to acceleration forces along gyroscope support shaft 12, gyroscope rotor 11 due to its inertia will exert a compressional force against one of the piezoelectric reactor-sensor elements 16. Piezoelectric sensor 22 converts this minute compression into a voltage proportional to the amount of displacement of gyroscope rotor 11 which is proportional to the acceleration. When this voltage is applied to piezoelectric reactor 23, it is caused to expand an amount proportional to the acceleration thereby forcing the gyroscope rotor 11 back into its equilibrium position. The voltage produced by sensor 22 is measurable and being a quantity proportional to acceleration it is useful as a control in inertial navigation and gun fire control systems in addition to causing reactor 23 to supply the equilibrium restoring force to gyroscope rotor 11.

Referring to FIG. 3 there is shown an electrical circuit by which the voltage provided by sensor 22 is picked up, amplified, and fed to reactor 23 to cause gyroscope rotor 11 to reattain its equilibrium position which had changed as a result of acceleration forces. It should be noted that the patricular manner in which electrical contact is made with each of the piezoelectric sensor-reactor crystals 16 forms no part of this invention and may be accomplished in one of the conventional manners as known to the art.

The voltage which is picked off from piezoelectric sensor 22 is necessarily very small. Therefore, in order to provide an effective means to cause reactor 23 to expand an amount proportional to acceleration force, this initial voltage which is also proportional to acceleration should be amplified. Therefore, a D.C. amplifier 31 is provided. D.C. amplifier 31 has input terminals 32 which are electrically connected to piezoelectric sensors 22. At the same time D.C. amplifier 31 has output terminals 33 electrically connected to reactors 23. Since positive acceleration along gyroscope support shaft 12 is in one direction or the other, it should be obvious that on acceleration in one direction voltage will be generated in one sensor only. This voltage is amplified and fed back to its associated reactor. If the acceleration is in the other direction then the other set of input and output terminals 32 and 33 of D.C. amplifier 31 carry the acceleration voltage. Therefore, regardless of whether acceleration is in one direction or the other along gyroscope support shaft 12, the voltage appearing at terminal 35 is a voltage proportional to the acceleration. This voltage may be used to energize a meter which would provide an indication of the actual acceleration or to provide guidance information to the overall navigational guidance system in which gyroscopes of the present type are used.

Obviously D.C. amplifier may be of the type which provides a sensing of the particular direction of acceleration as, for example, providing a proportional voltage which is positive or negative at terminal 35 depending on the direction of acceleration.

Obviously other more sophisticated electronic circuitry may be used with the acceleration measuring gyroscope of the present invention, such as, for example, an oscillator circuit which has its output frequency modulated in accordance with the voltage from sensor 22. Comparison of this output frequency with the natural frequency of the oscillator to provide an output proportional to acceleration may be accomplished in any convenient manner.

Obviously other modifications of the persent invention are possible in the light of the above teachings. It is, therefore, to be understood that, within the scope of the appended claims, the invention may be practiced otherwise than as specifically described.

What is claimed is:

1. In an acceleration measuring gyroscope:
   shaft means,
   gyroscope rotor means mounted for rotation on said shaft means in an equilibrium position,
   piezoelectric reactor means mounted on said shaft means for restoring said gyroscope rotor means to its equilibrium position on being displaced in response to acceleration forces along said shaft means.

2. In an acceleration measuring gyroscope:
   shaft means,
   gyroscope rotor means mounted for rotation on said shaft means in an equilibrium position,
   piezoelectric sensor means mounted on said shaft means responsive to displacement of said gyroscope rotor along said shaft means due to acceleration to provide a voltage proportional to said acceleration,
   piezoelectric reactor means mounted on said shaft means adjacent and electrically connected to said piezoelectric sensor means for restoring said gyroscope rotor means to its equilibrium position in accordance with said proportional voltage.

3. In an acceleration measuring gyroscope:
   shaft means,
   gyroscope rotor means mounted for rotation on said shaft means in an equilibrium position,
   piezoelectric sensor means mounted on said shaft means responsive to displacement of said gyroscope rotor means along said shaft means due to acceleration to provide a voltage proportional to said acceleration,
   piezoelectric reactor means mounted on said shaft means adjacent said piezoelectric sensor means,
   amplifier circuit means electrically connected between said piezoelectric sensor and said piezoelectric reactor means applying said proportional voltage to said piezoelectric reactor means,
   whereby said piezoelectric reactor means restores said gyroscope rotor to its equilibrium position on said shaft means.

4. In an acceleration measuring gyroscope:
   support shaft means,
   air thrust bearing means disposed at each end of said support shaft means,
   gyroscope rotor means mounted for rotation on said support shaft means in an equilibrium position between each of said air thrust bearing means,
   piezoelectric sensor-reactor means mounted on said support shaft means adjacent each of the outer sides of each of said air thrust bearing means restoring said gyroscope rotor means to its equilibrium position on said support shaft means on being displaced therefrom due to acceleration forces in a direction parallel to said support shaft means.

5. In an acceleration measuring gyroscope according to claim 4 wherein each of said piezoelectric sensor-reactor means comprises:
   a piezoelectric sensor crystal responsive to displacement of said gyroscope rotor means along said support shaft means due to acceleration to provide a voltage proportional to said acceleration,
a piezoelectric reactor crystal adjacent said piezoelectric sensor crystal and electrically connected thereto for restoring said gyroscope rotor means to its equilibrium position in response to said proportional voltage.

6. In an acceleration measuring gyroscope:
support shaft means,
air thrust bearing means disposed at each end of said support shaft means,
gyroscope rotor means mounted for rotation on said support shaft means between each of said air thrust bearing means,
a pair of piezoelectric sensor crystals mounted on said support shaft means,
each of said piezoelectric sensor crystals having a side adjacent one of said air thrust bearing means,
whereby compression of either of said piezoelectric sensor crystals due to acceleration caused displacement of said gyroscope rotor means along said support shaft means produces a voltage proportional to the acceleration in said piezoelectric crystal.

7. In an acceleration measuring gyroscope:
support shaft means,
air thrust bearing means disposed at each end of said support shaft means,
gyroscope rotor means mounted for rotation on said support shaft means between each of said air thrust bearing means,
a pair of piezoelectric sensor crystals mounted on said support shaft means,
each of said piezoelectric sensor crystals having one side adjacent one of said air thrust bearing means,
a pair of piezoelectric reactor crystals mounted on said support shaft means,
each of said piezoelectric reactor crystals having a side adjacent the other side of each of said piezoelectric sensor crystals,
circuit means electrically connecting each piezoelectric sensor crystal to its adjacent reactor crystal,
whereby voltage caused by the compression of either of said piezoelectric sensor crystals due to acceleration caused displacement of said gyroscope rotor means along said support shaft means causes its said adjacent reactor crystal to expand an equal amount.

References Cited in the file of this patent

UNITED STATES PATENTS

| | | |
|---|---|---|
| 2,591,921 | Cosgriff | Apr. 8, 1952 |
| 2,822,694 | McKenny | Feb. 11, 1958 |
| 2,951,376 | Lahde | Sept. 6, 1960 |
| 3,083,578 | Rosato et al. | Apr. 2, 1963 |

FOREIGN PATENTS

| | | |
|---|---|---|
| 653,181 | Canada | Nov. 27, 1962 |